United States Patent [19]
Daniels

[11] 3,979,983
[45] Sept. 14, 1976

[54] WORKPIECE-HANDLING APPARATUS
[75] Inventor: Dennis Daniels, Bellevue, Wash.
[73] Assignee: U.S. Amada, Ltd., City of Industry, Calif.
[22] Filed: June 5, 1974
[21] Appl. No.: 476,374

[52] U.S. Cl. .................................. 83/277; 83/412; 83/424; 83/522; 214/1 F
[51] Int. Cl.[2] .......................................... B26D 7/06
[58] Field of Search .................. 83/277, 412, 435.2, 83/207, 424, 151, 522; 214/1 F; 74/237

[56] References Cited
UNITED STATES PATENTS

| | | | |
|---|---|---|---|
| 831,765 | 9/1906 | Beyer | 214/1 F |
| 2,359,140 | 9/1944 | Meitner | 83/277 X |
| 2,425,994 | 8/1947 | Chilton | 83/277 X |
| 3,194,100 | 7/1965 | Fehlberg | 83/277 X |
| 3,207,019 | 9/1965 | Vauzo et al. | 83/277 |
| 3,231,099 | 1/1966 | Kidd | 83/277 X |
| 3,349,658 | 10/1967 | Johns et al. | 83/277 X |
| 3,535,946 | 10/1970 | Miller | 74/237 X |
| 3,580,767 | 5/1971 | Barnes et al. | 74/237 X |
| 3,621,727 | 11/1971 | Cicognani | 74/237 X |
| 3,691,887 | 9/1972 | Roch | 83/277 |

FOREIGN PATENTS OR APPLICATIONS

| | | | |
|---|---|---|---|
| 401,139 | 8/1909 | France | 83/277 |

Primary Examiner—Frank T. Yost
Attorney, Agent, or Firm—Seed, Berry, Vernon & Baynham

[57] ABSTRACT

An ironworker is provided with a powered set of opposed workpiece clamps for accurately locating a workpiece beneath a punch or the like. The preferred form employs a rotary powered, numerically controlled means for moving the clamps.

A unique timing-belt drive is provided for moving long workpieces, such as elongated channels or the like, from a rotary powered input.

A workpiece clamp is provided with a stationary first workpiece-engaging member and a movable second workpiece-engaging member which is slidable along its longitudinal axis from an extended position where it is closely spaced and aligned above the first workpiece-engaging member to a retracted position where it is moved upwardly away from the first workpiece-engaging member and slid longitudinally rearwardly of the first workpiece-engaging member for lifting or placing a workpiece in position for clamping.

6 Claims, 11 Drawing Figures

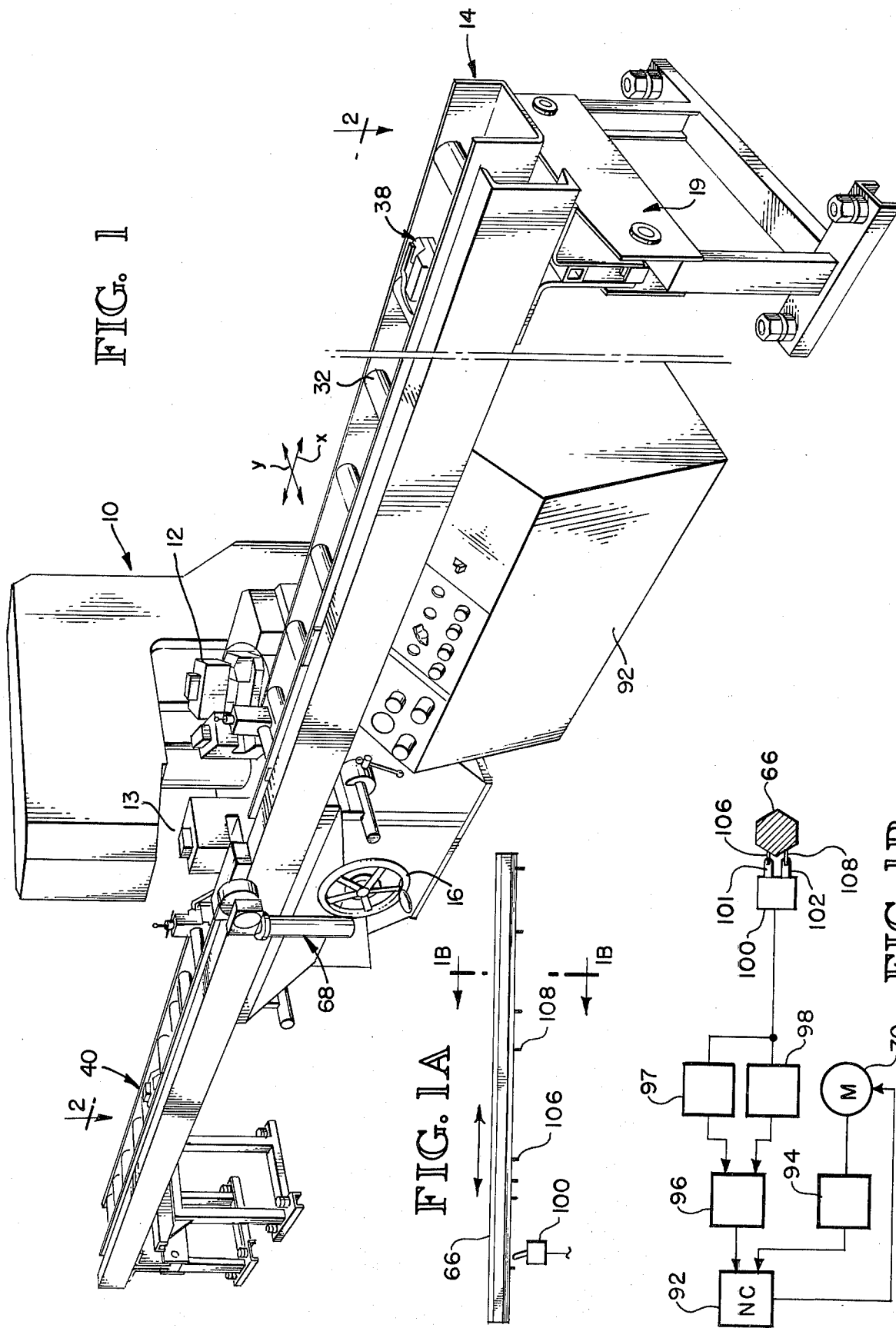

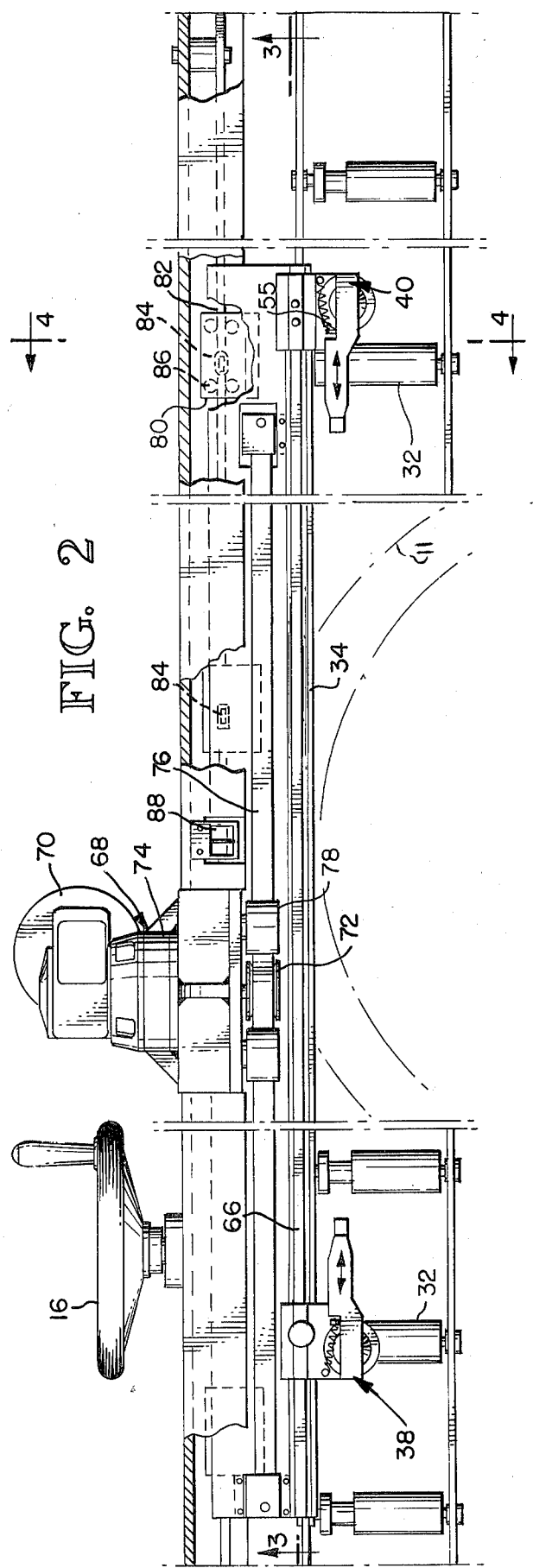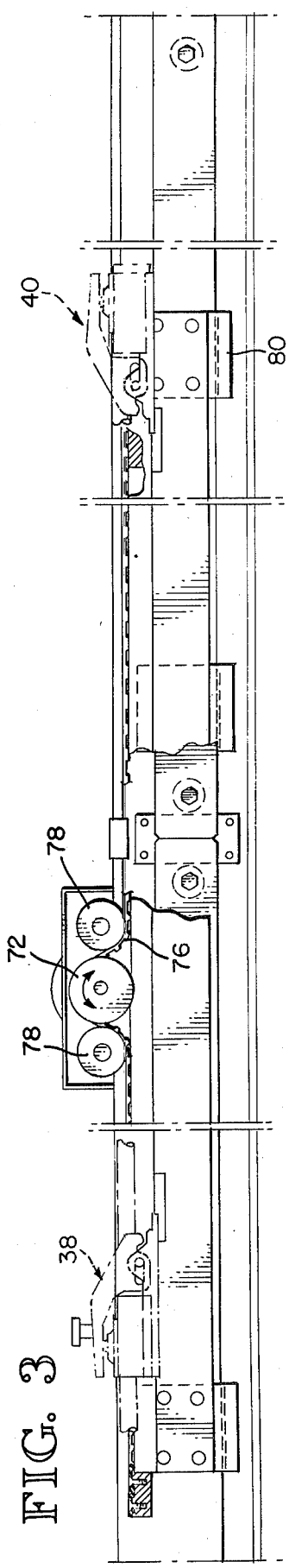

WORKPIECE-HANDLING APPARATUS

BACKGROUND OF THE INVENTION

1. Field of the Invention

This invention pertains to workpiece-positioning apparatus, particularly of the type designed for moving elongated structural members, such as channels, I-bars or the like, to an accurately located position beneath a punch or similar tool. The invention also pertains to a workpiece clamp that is particularly useful for allowing removal of the workpieces from above the clamp. The invention also pertains to a unique rotary-to-reciprocating drive for moving elongated structural members.

2. Description of the Prior Art

Heretofore, ironworkers, in particular, have been provided with workpiece-support tables that require the manual movement of the workpiece. Lateral movement of the workpiece has generally been done by a manually propelled crank which shifts a portion of the work table laterally toward and away from the punching station of the ironworker. Longitudinal movement of the workpiece has generally been done manually by grasping the workpiece and pushing it along a table. The manual manipulation of workpieces on the table is time-consuming and requires the judgment of the operator to determine the exact location on the workpiece for performing the punching, notching or suitable operation on the workpiece.

Workpiece clamps have heretofore been provided with an upper part which is rotatable in a horizontal plane to allow the placement of a workpiece on the lower part of the clamp. Such work clamps have not operated effectively in some cases due to the difficulty in having to provide both a rotational force and a clamping force on the upper clamp member.

SUMMARY OF THE INVENTION

It is an object of this invention to provide an ironworker having a support table on which the workpiece can be accurately, mechanically positioned longitudinally.

It is an another object of this invention to provide a numerically controlled gauging system for an ironworker or other apparatus of the type requiring long, accurate, lengthwise movements of elongated structural members.

It is another object of this invention to provide a semi-automated ironworker which is simple to operate and inexpensive to manufacture.

These objects are best obtained by providing a workpiece-support means for elongated structural members with opposed workpiece clamps engagable with the opposite ends of the workpiece, and means for simultaneously, accurately moving the workpiece clamps for accurately positioning the workpiece at a striker station.

Preferably, the clamps are positioned by a numerically controlled drive.

It is another object of this invention to provide an improved rotary-to-reciprocating drive for accurately moving various objects, including long structural members, through long distances.

This object is best obtained by providing an elongated, flexible, toothed belt that is fastened at each end to a guide member to be reciprocated in one mode or to a stationary base in another mode and is entrained about a toothed rotary drive roller and between idler rollers on either side of the drive roller for causing tight driving movement between the drive roller and the elongated driving member to reciprocate the guide member in the first mode or to reciprocate the toothed rotary drive roller in the other mode.

Preferably, the rotary drive roller is powered by a motor but the drive roller can also be manually rotated by a crank.

It is another object of this invention to provide workpiece holding means that is simple to manufacture and operates efficiently to open and close on a workpiece.

It is another object to provide a workpiece clamp which is pneumatically operated to uncover one of the members of the clamp so that the workpiece can be moved into engagement with the exposed member of the clamp in a direction perpendicular to the face of the exposed member.

It is another object of this invention to provide a workpiece clamp in which the upper member or finger of the clamp can be raised and slid longitudinally of the clamp member to expose the face of the lower clamp member.

Basically, these objects are obtained by providing a workpiece clamp with a housing having a first workpiece-engaging member stationary with the housing and a second workpiece-engaging member which is movable relative to the stationary workpiece-engaging member from an extended position in which the movable workpiece-engaging member is overlying the stationary workpiece-engaging member and biased toward the stationary workpiece-engaging member and then is movable along the length of the stationary workpiece-engaging member into a retracted position spaced from the stationary workpiece-engaging member and movable in a direction along the length of the first workpiece-engaging member.

In the preferred form of this invention, the movable workpiece-engaging member is first slid outwardly into opposed position relative to the stationary workpiece-engaging member and then is subsequently pivoted toward the stationary workpiece-engaging member. Movement outwardly is effected by a pneumatically powered piston which, after it has moved to extend the movable workpiece-engaging member, automatically directs the pneumatic pressure to a second pneumatic piston to pivot the movable workpiece-engaging member toward the stationary workpiece-engaging member.

As is readily apparent, the control can be obtained pneumatically and with simple movements to effect engagement and disengagement of the workpiece.

BRIEF DESCRIPTION OF THE FIGURES OF THE DRAWING

FIG. 1 is an isometric of an apparatus embodying the principles of the invention.

FIGS. 1A and 1B are schematic illustrations of a typical N.C. control for accurately controlling movement of a workpiece.

FIG. 2 is a fragmentary plan of a portion of the apparatus illustrated in FIG. 1 and taken along the line 2—2 of FIG. 1.

FIG. 3 is fragmentary vertical section taken along the line 3—3 of FIG. 2.

DESCRIPTION OF THE PREFERRED EMBODIMENTS

FIG. 1 illustrates an ironworker 10, typical of a type of apparatus requiring movement and handling of elongated workpieces, such as elongated structural members W or the like. The ironworker is provided with tools 12 mounted on a turret 11 which can be rotated to position the tools at an operating station, such as a punching station 13. A workpiece-supporting table 14 holds the workpiece and allows it to be moved relative to the tool at the operating station 13 so that the desired punching, shearing, notching, drilling or suitable operation can be performed at an exact location on the workpiece.

Figure 6:
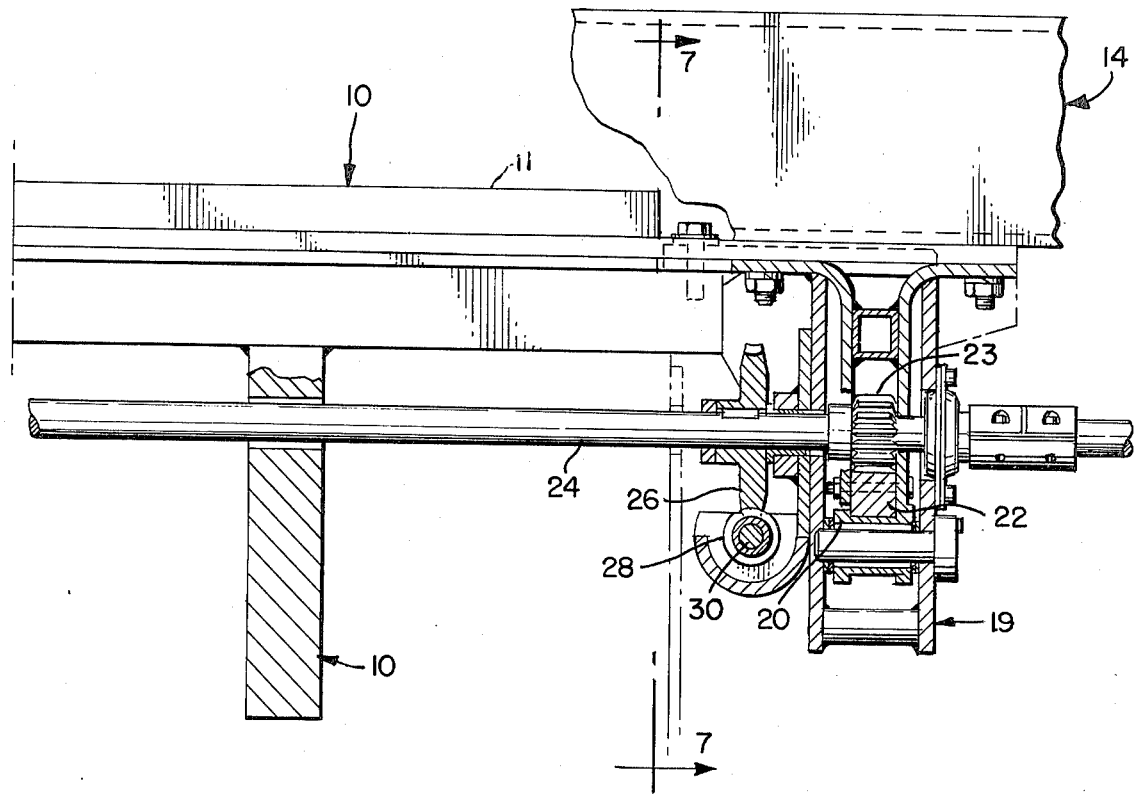
FIG. 6 is a vertical section taken along the line 6—6 of FIG. 7.
Figure 7:
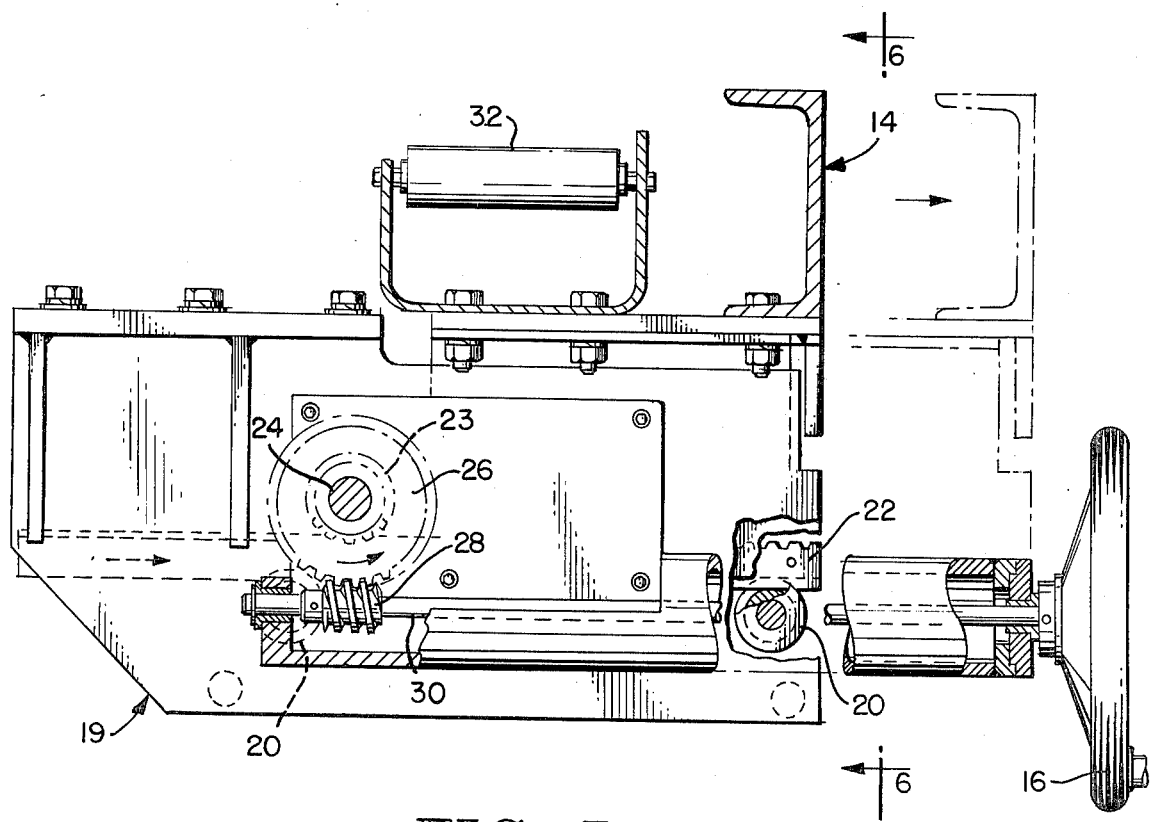
FIG. 7 is a vertical plan taken along the line 7—7 of FIG. 6.

As in previous apparatus designed for handling elongated workpieces, the work table can be shifted in a Y-axis in any suitable manner by manually turning a crank 16. For this purpose, the table is supported on pedestals 19. As best shown in FIGS. 6 and 7, the pedestals are provided with rollers 20 which support a gear rack 22. The gear rack is reciprocated by a pinion 23 that is coupled to a shaft 24. The shaft 24 extends the length of the table 14 to simultaneously drive the gear racks of each of the pedestals 19. Shaft 24 is rotated by a gear 26 that meshes with a worm gear 28. The worm gear 28 is keyed to a shaft 30 that is rotated by the crank 16.

The table 14 is also provided with a plurality of rollers 32 for moving the workpiece lengthwise on the table and a vertical gauge bar 34. As is well understood, the workpiece is slid on the rollers and abuts against the gauge bar 34. Movement of the crank 16 then moves the table 14 with the workpiece toward and away from the operating station 13 to accurately position the workpiece laterally.

Figure 8:
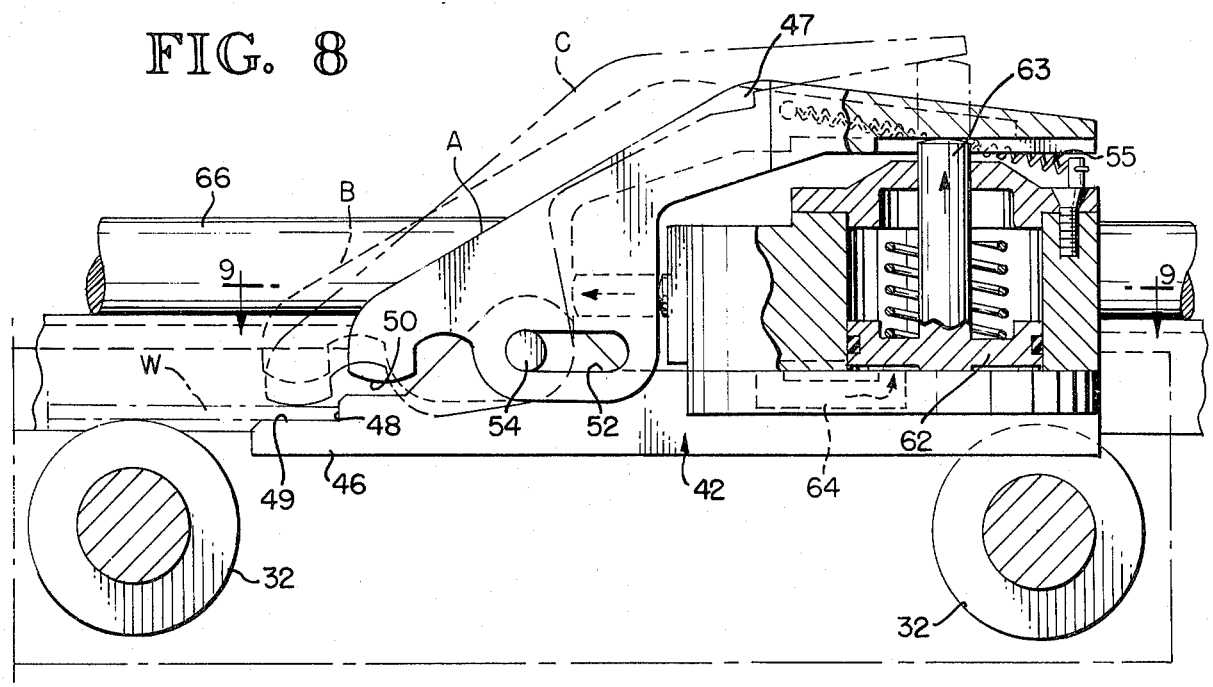
FIG. 8 is a fragmentary section taken along the line 8—8 of FIG. 4, particularly through a workpiece clamp embodying the principles of the invention.

Movement of the workpiece lengthwise can be accomplished mechanically through a manual input or automatically through a conventional numerical control input. For this purpose, the table 14 is provided with a pair of workpiece clamps 38 and 40 which lie in opposed relation at a substantial distance from each other on the table. The clamps 38 and 40 are identical and, as best shown in FIG. 8, include a housing 42 which is integrally provided with a stationary workpiece-engaging member or finger 46 and a movable workpiece-engaging member or finger 47. Finger 46 is provided with a recess having a stop or gauging surface 48 and a clamping surface 49. Finger 47 is provided with a clamping surface 50.

Movable finger 47 can be slid longitudinally of its length from a solid line position marked A through an intermediate position marked B where it extends out over the surface 49 and thence into a clamping position marked C where it can squeeze the workpiece between the surface 50 and the surface 49 to hold it tightly during movement of the clamp.

Figure 9:
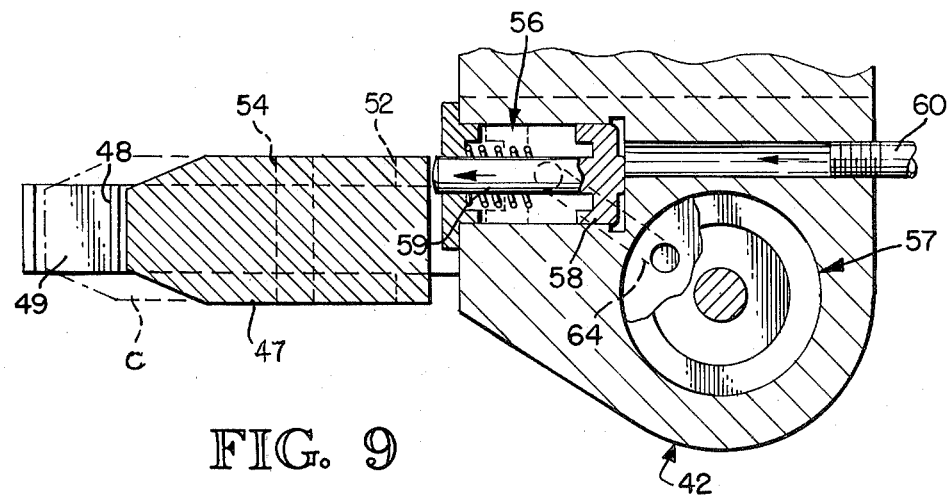
FIG. 9 is a section taken along the line 9—9 of FIG. 8.

In order to move the movable finger 47, the movable finger is provided with a slot 52 that rides on a pin 54 mounted on the housing 42. The movable finger 42 is held in a retracted position by a spring 55 and thus allows a workpiece to be lowered vertically onto the surface 49 of the stationary finger 46. The movable finger is extended against the force of the spring 47 by a pair of interrelated pneumatic cylinder and piston actuators 56 and 57. Actuator 56 is provided with a piston 58 having a piston rod 59 that abuts against the movable finger 47. Air pressure from a line 60 moves the piston 58 to the left to extend the movable finger to the left, as viewed in FIG. 8. Actuator 57 is provided with a piston 62 having a piston rod 63 that abuts against the underside of the rearward end of the finger 47. Piston 62 is raised by air pressure from a conduit 64, as best shown in FIG. 9, that is opened after the piston 58 is moved past the conduit. Thus, air entering conduit 60 first moves the piston 58 to move the finger 47 along the pin 54 to position B, and thence the finger is pivoted about the pin 54 into position C.

Clamp 38 is adjustably secured to a guide member 66 that runs over a substantial length of the table 14. The adjustment allows the clamp to be moved to accommodate different lengths of workpieces. Clamp 40 is more permanently secured to the guide member 66 so that measurements along the workpiece can be taken from clamp 40 as a reference point.

Figure 4:
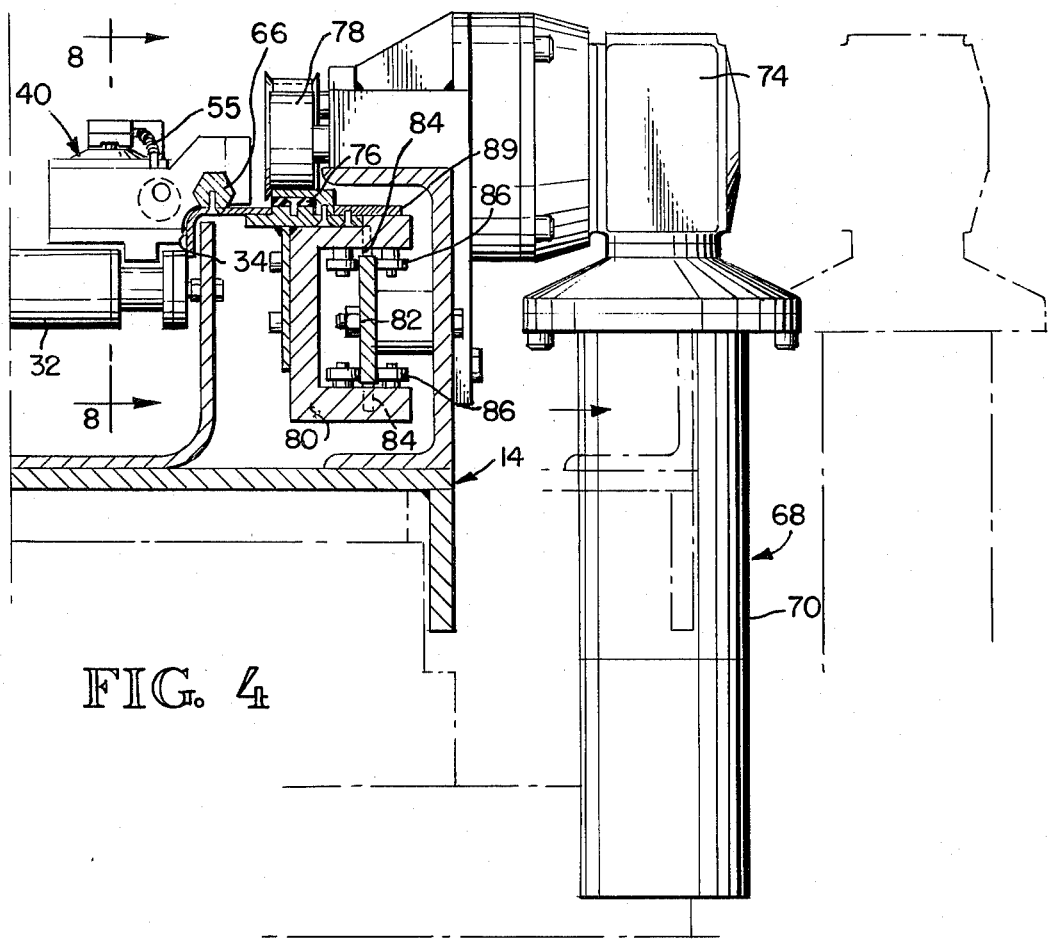
FIG. 4 is a vertical section taken along the line 4—4 of FIG. 2.

Guide member 66 is moved along the workpiece table 14 by a unique rotary-to-reciprocating drive 68. The drive is best shown in FIGS. 2-4 and includes a numerically controlled, rotary drive motor 70 that drives a geared roller 72 through a suitable transmission 74. The toothed roller 72 drives an elongated, toothed, flexible timing belt 76. The timing belt is of a conventional type that is a combination of rubber and wire strands. The belt is pre-stretched beyond the maximum load anticipated so that subsequent loading on the belt during use does not provide additional stretch. A pair of idler rollers 78 are spaced on either side of the drive roller 72 to press the belt around a substantial circumferential contact zone with the roller 72. This substantial contact allows accurate repetitive movement of the timing belt 76 upon rotation of the roller 72. The timing belt is stretched tightly and fastened at either end to a movable bracket 80. As is best shown in FIG. 4, the movable bracket 80 supports the gauging plate 34 and the elongated guide member 66. The bracket 80 is movably mounted on a support plate 82 that is secured to the workpiece-supporting table 14. Movement of the bracket 80 along the plate 82 is provided through upper and lower sets of spaced rollers 84. Twisting of the bracket about a horizontal axis is prevented by upper and lower sets of spaced rollers 86.

As is readily understood, rotation of the roller 72 by the motor 70 moves the bracket 80, along with the guide member 66, clamps 38 and 40, and the gauging surface 34, lengthwise along the table 14. Since the timing belt is pre-stretched, and since the teeth of the timing belt are accurately manufactured, very accurate positioning of a workpiece along its length can be obtained. A measurement can be visually monitored by a sight gauge 88 which consists essentially of accurately measured marks on a plate 89 that travels with the bracket 80.

The teeth of the timing belt can be manufactured very accurately so that movement of the clamps can be obtained directly from the numerical control. A less expensive timing belt is preferred and, as a result, exact repetitive distance between the teeth will not always be accurately obtained. The error in the spacing between teeth is further compounded during the pre-stretching of the timing belt, resulting in a belt in which the teeth are not all exactly the same distance apart. As best shown in FIGS. 1A and 1B, a suitable control is provided for automatically compensating in a known manner for errors. For this purpose, a numerical control unit 92 is provided with an input from a feedback circuit 94 that is coupled to the motor 70. This feedback circuit tells the control exactly where the workpiece should have been moved by the motor. To this feedback signal is added or substracted a pulse or pulses equivalent to some correction factor, for example, .005 of an inch. The input from the pulses is obtained from a mixer 96 which receives a pulse from generator 97 and a direction signal from an indicator 98. Direction of motion can be obtained in any desired manner with the polarity of the signal from pulse generator 97 being additive or subtractive, depending upon whether the compensation must be added or substracted to the actual movement provided by the motor 70. One manner for mechanically providing the additive or subtractive correction is to provide a sensor 100 having an upper probe 101 and a lower probe 102 that pass with movement of the bracket 80 past a fixed control bar or the guide bar 66. The guide bar is provided with an upper set of switch actuators 106 which signal additive corrections and a lower set of contacts 102 which signal subtractive corrections. Details of making such corrections to a numerically controlled device are well known in the art and further description is not believed necessary.

Although not illustrated, the rotary-to-reciprocating drive is equally applicable to reciprocating the roller 72 by fixing the ends of the flexible belt. That is, the drive motor and roller 72 can be movably mounted on a track and carry an elongated guide member such as 66 or a single object, such as a movable stop or a sensor switch. When the drive motor is energized, the roller 72 will roll along the stationary belt carrying the guide member or stop with it and accurately position the object lengthwise of the belt. The importance of the drive is in its ability to move an object accurately over a long distance, for example, exceeding 60 feet.

Figure 5:
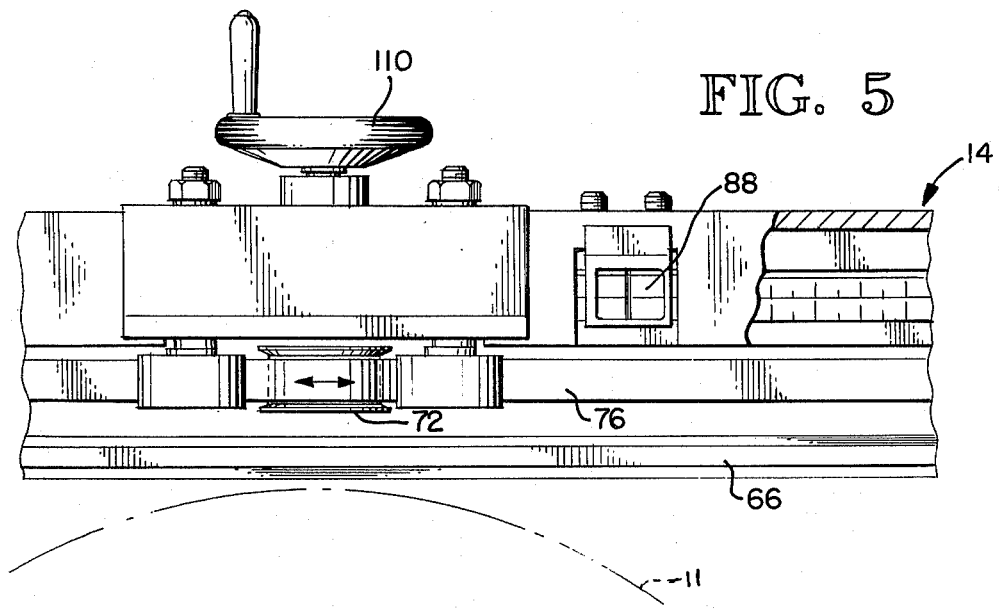
FIG. 5 is a fragmentary plan similar to FIG. 2, but illustrating a modified form of the invention.

A manually propelled, rotary-to-reciprocating drive is illustrated in FIG. 5 and includes a handle 110 which drives a shaft that is keyed to the toothed roller 72. The timing belt 76 is again driven in the same manner as in the preferred embodiments, but rather than relying on numerical control for positioning the workpiece, the operator must rely exclusively on the sight gauge 88.

The overall operation of the apparatus should be readily understood from the foregoing description. An operator places an elongated workpiece on the rollers 32 and into the opened clamp 40. The clamp 38 is then slid along the guide bar 66 until the stop surface 48 engages the end of the workpiece. The clamps are then closed to hold the workpiece. Lateral positioning of the workpiece is obtained by cranking the handle 16 to shift the table laterally toward or away from the operating station 13. In the numerically controlled embodiment, the operator then pushes the "proceed" button on the control 92 and the motor 70 automatically moves the clamps 38 and 40 to the desired location lengthwise beneath the operating station 13. The punching or other suitable operation then occurs and subsequent movements can proceed until the operation is completed on the workpiece. Since workpieces such as angles, channels and the like are often extremely heavy, it can be seen that these heavy workpieces can be quickly and very accurately located at the operating station so that human error is substantially reduced and all operations can be performed by a single workman.

While the preferred embodiments of the invention have been illustrated and described, it should be understood that variations will be apparent to one skilled in the art without departing from the principles of the invention. Accordingly, the invention is not to be limited to the specific forms illustrated.

I claim:

1. In an ironworker, punch press or similar apparatus which requires handling elongated structural members and having an operating station, a tool at said operating station and workpiece support means operable to support a workpiece, such as an angle, I-bar, plate, etc., at said operating station, the improvement comprising:

workpiece-positioning means on said workpiece support means, said positioning means including workpiece holding means, and gauging means for moving said holding means for accurately positioning the workpiece at the operating station, said gauging means including a flexible, relatively inelastic belt having teeth substantially evenly spaced along the length thereof, means connecting the workpiece holding means to said belt for movement therewith, and means for moving said belt lengthwise for moving said workpiece-handling means toward and away from said operating station.

2. The apparatus of claim 1 wherein said workpiece holding means includes a set of opposed workpiece clamps for engaging opposite ends of the workpiece and moving together to position the workpiece.

3. The apparatus of claim 2, said means connecting said belt to said workpiece holding means including an elongated bar fastened at either end to said belt and means for securing said holding means to said bar, at least one of said securing means being adjustable along the bar for varying the distance between the set of opposed workpiece clamps.

4. The apparatus of claim 1, said gauging means including numerically controlled motor means having a pinion gear operatively joined to said belt for moving the belt.

5. The apparatus of claim 1, said means for moving said belt including a rotatable pinion gear and a pair of idler gears spaced alongside said pinion gear and operably pressing the belt tightly into driving engagement with the pinion gear whereby rotation of the pinion gear will drive the belt lengthwise.

6. In an ironworker, punch press or similar apparatus which requires handling elongated structural members and having an operating station, a tool at said operating station and workpiece support means operable to support a workpiece, such as an angle, I-bar, plate, etc., at said operating station, the improvement comprising:

workpiece-positioning means on said workpiece support means, said workpiece positioning means including workpiece holding means and gauging means for moving said workpiece holding means for accurately positioning the workpiece to close tolerances at the operating station, said gauging means including a stationary, flexible, relatively inelastic belt having a single run with teeth substantially evenly spaced along the length thereof, and rotary drive means coupled to said workpiece holding means and movable therewith along said belt, said rotary drive means including a rotary driven pinion meshing with said teeth of said flexible belt for converting rotary motion of the pinion to reciprocating motion of the rotary drive means and thus the workpiece holding means.

* * * * *